(12) United States Patent
Klustaitis et al.

(10) Patent No.: US 8,832,435 B2
(45) Date of Patent: Sep. 9, 2014

(54) PROVIDING A REAL-TIME INDICATION OF PLATFORM TRUST

(71) Applicant: International Business Machines Corporation, Armonk, NY (US)

(72) Inventors: Paul Klustaitis, Durham, NC (US); Nathan C. Skalsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/716,854

(22) Filed: Dec. 17, 2012

(65) Prior Publication Data

US 2014/0173689 A1  Jun. 19, 2014

(51) Int. Cl.
  *H04L 9/32* (2006.01)
  *G06F 21/57* (2013.01)

(52) U.S. Cl.
  CPC .................................... *G06F 21/57* (2013.01)
  USPC ............... 713/165; 726/25; 726/30; 713/176

(58) Field of Classification Search
  CPC ..... H04L 63/08; H04L 63/10; H04L 12/2461; G06F 21/6209
  USPC ............................ 726/2, 25, 30; 713/165, 176
  See application file for complete search history.

(56) References Cited

U.S. PATENT DOCUMENTS

| | | | |
|---|---|---|---|
| 3,985,142 A | 10/1976 | Wickham | |
| 5,772,691 A | 6/1998 | Routh et al. | |
| 5,966,379 A | 10/1999 | Phillips et al. | |
| 7,096,353 B2 * | 8/2006 | Smith et al. | 713/152 |
| 7,587,750 B2 * | 9/2009 | Zimmer et al. | 726/2 |
| 8,112,630 B2 * | 2/2012 | Jung et al. | 713/176 |
| 8,558,685 B2 * | 10/2013 | Long et al. | 340/500 |
| 2009/0204964 A1 | 8/2009 | Foley et al. | |
| 2010/0050244 A1 | 2/2010 | Tarkhanyan et al. | |

(Continued)

FOREIGN PATENT DOCUMENTS

| | | |
|---|---|---|
| FR | 2888435 A1 | 1/2007 |
| RU | 2321055 C2 | 3/2008 |

OTHER PUBLICATIONS

IBM, "A Method for Reliably and Securely Requesting and Reporting Integrity Metrics to the User Interface of a Computing Platform", IP.com Prior Art Database, IPCOM000136762D, Jun. 1, 2006, pp. 1-5, USA.

(Continued)

*Primary Examiner* — Amare F Tabor
(74) *Attorney, Agent, or Firm* — Edward J. Lenart; Katherine S. Brown; Biggers Kennedy Lenart Spraggins LLP

(57) ABSTRACT

Methods and apparatuses for providing a real-time indication of platform trust are provided. Embodiments include an integrity reporting module determining that a platform is currently operating in a system management mode (SMM) and receiving from an integrity measurement module, an integrity measurement results signal. Embodiments also include the integrity reporting module determining whether the received integrity measurement results signal indicates the platform is trusted. If the received integrity measurement results signal indicates that the platform is trusted, the integrity reporting module provides to a user of the platform, a real-time visual indication that the platform is trusted. If the received integrity measurement results signal indicates that the platform is not trusted, the integrity reporting module provides to the user a real time visual indication that the platform is not trusted.

18 Claims, 4 Drawing Sheets

(56) References Cited

U.S. PATENT DOCUMENTS

2010/0082991 A1* 4/2010 Baldwin et al. ............... 713/176
2010/0161998 A1* 6/2010 Chen et al. .................... 713/189
2010/0188975 A1* 7/2010 Raleigh ...................... 370/230.1
2010/0306531 A1 12/2010 Nahari
2011/0264922 A1 10/2011 Beaumont et al.
2013/0263262 A1* 10/2013 Forristal ......................... 726/22

OTHER PUBLICATIONS

Azab, et al., "HyperSentry: Enabling Stealthy In-context Measurement of Hypervisor Integrity", Proceedings of the 17$^{th}$ ACM Conference on Computer and Communications Security (CCS'10), Oct. 2010, pp. 38-49, Association for Computing Machinery (ACM), New York, NY, USA, ISBN No. 978-1-4503-0245-6.

* cited by examiner

PROVIDING A REAL-TIME INDICATION OF PLATFORM TRUST

BACKGROUND OF THE INVENTION

1. Field of the Invention

The field of the invention is data processing, or, more specifically, methods and apparatuses for providing a real-time indication of platform trust.

2. Description of Related Art

Knowing the security state of a computing platform is fundamental to the meaningful administration of individual machines and the responsible sharing of sensitive data and computational tasks with remote machines. To aid in this evaluation of security, servers often utilize applications designed to measure the integrity of privileged software executing on a platform. However, a determination of a security state may only be valid for a set time period as conditions related to the platform may change.

SUMMARY OF THE INVENTION

Methods and apparatuses for providing a real-time indication of platform trust are provided. Embodiments include an integrity reporting module determining that a platform is currently operating in a system management mode (SMM) and receiving from an integrity measurement module, an integrity measurement results signal. Embodiments also include the integrity reporting module determining whether the received integrity measurement results signal indicates the platform is trusted. If the received integrity measurement results signal indicates that the platform is trusted, the integrity reporting module provides to a user of the platform, a real-time visual indication that the platform is trusted. If the received integrity measurement results signal indicates that the platform is not trusted, the integrity reporting module provides to the user a real time visual indication that the platform is not trusted.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
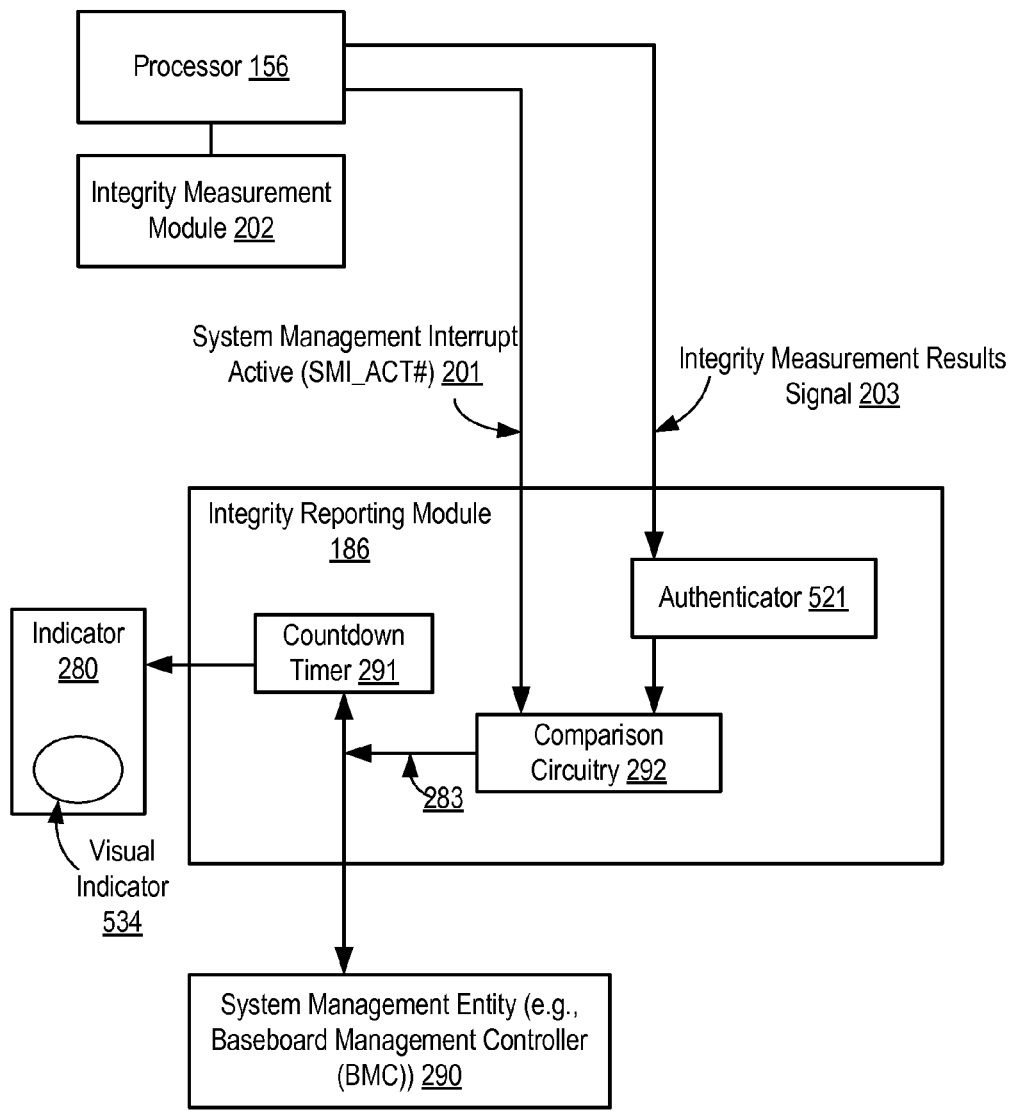
FIG. 1 sets forth a block diagram of automated computing machinery comprising an integrity reporting module useful for providing a real-time indication of platform trust according to embodiments of the present invention.

Exemplary methods and apparatuses for providing a real-time indication of platform trust in accordance with the present invention are described with reference to the accompanying drawings, beginning with FIG. 1. FIG. 1 sets forth a block diagram of automated computing machinery comprising an integrity reporting module (186) useful for providing a real-time indication (534) of platform trust according to embodiments of the present invention.

The integrity reporting module (186) is configured to report results of an integrity measurement operation performed by an integrity measurement module (202). An integrity measurement module is a framework designed to continuously measure and self-attest the integrity of a platform, such as an operating system or a hypervisor. That is, the integrity measurement module (202) performs the integrity measurement operation and the integrity reporting module (186) reports the results to a user. The integrity reporting module reports the results to a user by providing a real-time visual indication. In the example of FIG. 1, the real-time visual indication (534) is a light display. The light display may be positioned on the front of a server panel so that a user of the system may view whether the platform executing on the server is trusted or has been compromised. For example, if the visual indicator (534) is turned off, the platform is not trusted and if the visual indicator (534) is on the platform is trusted.

As discussed above, a determination of a security state of a platform may be valid for only a temporary amount of time or as long as the platform is static. For example, if an integrity measurement operation determines that a platform is secure during a boot sequence but before a workload is applied, then sometime after the platform begins processing a workload, the security state of the platform may be jeopardized or at least called into question. According to embodiments of the present invention, however, the integrity measurement module (202) is able to periodically perform an integrity measurement operation on a platform during booting and workload stages. That is, the integrity measurement module (202) is able to continuously assess the security state of the platform and continuously provide that assessment to the integrity reporting module (186). Likewise, the integrity reporting module (186) is configured to continuously report that assessment by providing a visual real-time indication to a user. The visual indication (534) is described as providing a "real-time" indication because the indication is based on continuous periodic assessments from the integrity measurement module (202).

The integrity measurement module (202) may employ any number of integrity measurement operations involving one or more security components available to a platform, such as hardware-protected SMRAM, system management code of the System Management Mode (SMM), Trusted Platform Module (TPM), Intelligent Platform Management Interface (IPMI), other out-of-band channels, firmware, privileged software, and others as will occur to those of skill in the art. Integrity measurement modules may include many components that reside in different components of a platform. For example, one piece of an integrity measurement module may reside in hardware-protected SMRAM and another component may reside in the actual software being measured (i.e., a measurement agent).

As described above, SMM is an important aspect of integrity measurement. SMM is an x86 operating mode designed to handle system management functions. A CPU enters the SMM upon receiving an SMI, triggered by either software or hardware events. SMM is an independent and protected environment that cannot be tampered by software running on the system. Moreover, SMM's code is stored in a designated, lockable memory called SMRAM. Locking SMRAM (through the memory controller's D_LCK bit) prevents all access to it except from within the SMM. Currently, all BIOS manufactures lock the SMRAM before the system boots to prevent SMM misuses. The integrity measurement module may include one or more components with this locked SMRAM.

When an SMI is invoked, the hardware saves the current CPU state to a dedicated state save map and switches the context to the SMM. After the SMI finishes, it executes the RSM instruction to resume the interrupted CPU operation. All interrupts, including the non-maskable ones, are disabled upon entering the SMM. Thus, even a hypervisor cannot interfere with a SMI handler execution as long as the SMRAM is locked. IPMI is also another important security component that may be utilized by an integrity measurement module. IPMI is a server-oriented platform management interface directly implemented in hardware and firmware. The key characteristic of the IPMI is that its management functions are independent of the main processors, BIOS, and system software (e.g., OS, hypervisor), and thus can bypass the hypervisor's observation. IPMI relies on a microcontroller embedded on the motherboard of each server, called the Baseboard Management Controller (BMC), to manage the interface between system management software and platform management hardware. Remote access to IPMI is usually authenticated (e.g., via SSH). In a particular embodiment, the integrity measurement module may utilize IPMI to reach the BMC on the target platform's motherboard to remotely trigger a hardware SMI, which in turn triggers the integrity measurement of the hypervisor. However, according to embodiments of the present invention, other mechanisms may be used to trigger hardware SMIs.

In the example of FIG. 1, the integrity reporting module (186) includes an authorizer (521), comparison circuitry (292), and a count-down timer (291). The authorizer (521) is configured to receive and authorize an integrity measurement results signal (203) from the integrity measurement module (202) via a processor (156). An integrity measurement results signal is a result of an integrity measurement and attestation operation performed by the integrity measurement module (202). The authorizer (521) may include any number of criteria and rules to determine whether the integrity measurement results signal (203) is valid and authorized. If the integrity measurement results signal (203) is authorized, the signal (203) is provided to the comparison circuitry (292).

The comparison circuitry (292) is also configured to receive a system management interrupt active (SMI_ACT#) signal (201) from the processor (156). A SMI_ACT# signal is a signal that informs external logic that a processor is in system management mode (SMM). The SMI_ACT# signal may also be used to specify access to SMRAM so that SMRAM can be accessed. That is, the SMI_ACT# signal can be an indication that the integrity measurement module (202) is performing an integrity measurement operation on the platform. The comparison circuitry (292) may be configured to generate a result signal (283) based on the values of the SMI_ACT# signal (201) and the integrity measurement results signal (203). In a particular embodiment, the comparison circuitry (292) includes an AND gate that requires an indication that the platform is trusted (via the integrity measurement results signal (203)) and that the platform is in SMM (via the SMI_ACT# signal (201)). The result signal (283) may be provided to a countdown timer (291) and to a system management entity (290), such as a Baseboard Management Controller (BMC). In response to receiving the result signal (283), the system management entity (290) may also be informed of whether the platform is trusted and can take appropriate actions in response to an assessment that the platform is not trusted (e.g., shutting down one or more components of the system).

The countdown timer (291) may be configured to count down and continuously provide a signal to the indicator (280) and the visual indicator (534) until receiving an indication via the result signal (283) that the integrity management module (202) has concluded that the platform is not trusted. That is, according to embodiments of the present invention, results of a security state determination of a platform may be reliably and meaningfully reported to a user and a system management entity, such as a BMC.

Figure 2:
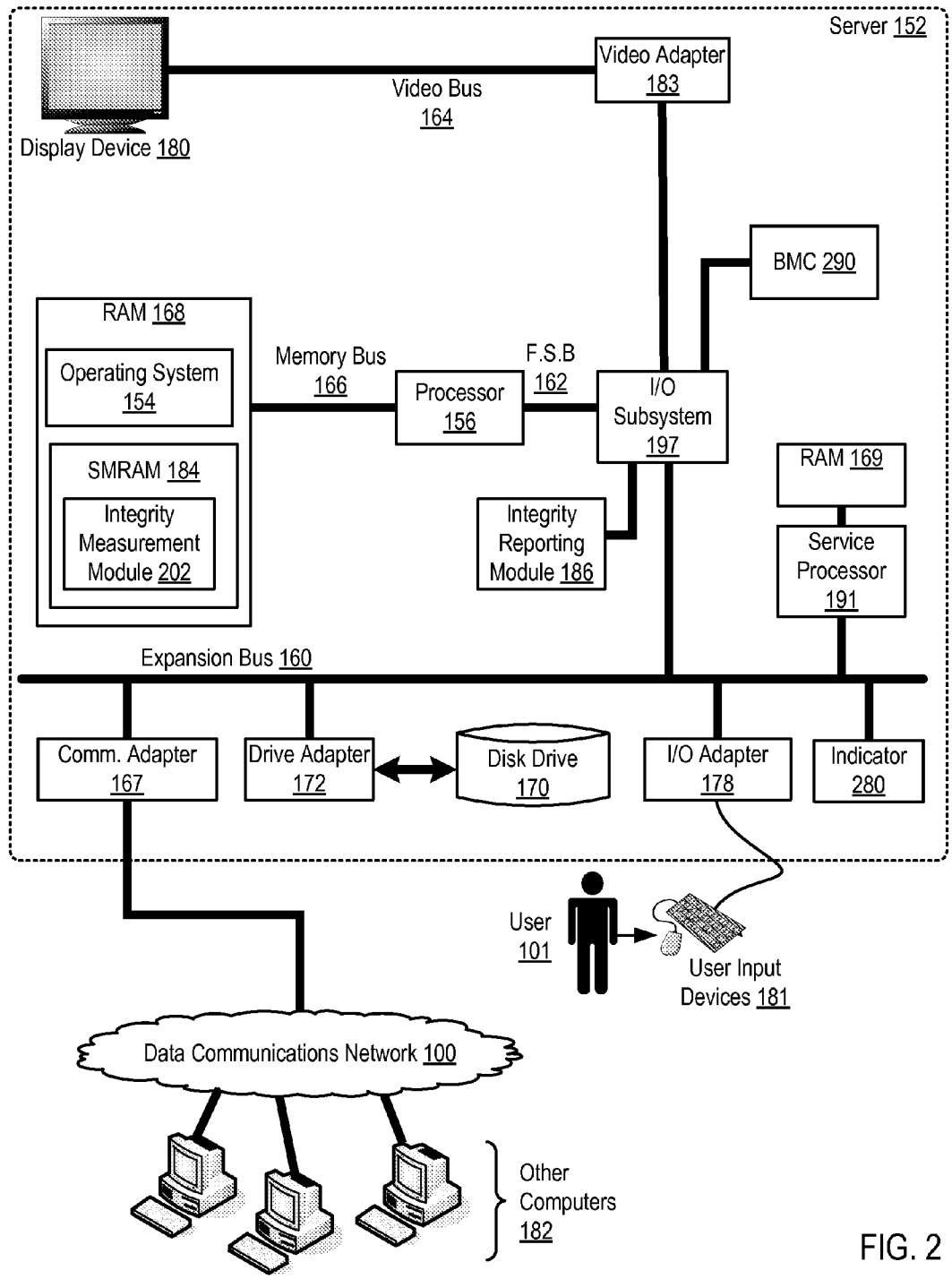
FIG. 2 sets forth a block diagram of automated computing machinery comprising an exemplary computer configured to provide a real-time indication of platform trust according to embodiments of the present invention.

FIG. 2 sets forth a block diagram of automated computing machinery comprising an exemplary computer configured to provide a real-time indication of platform trust according to embodiments of the present invention. Providing a real-time indication of platform trust in accordance with the present invention is generally implemented with computers, that is, with automated computing machinery. FIG. 2 sets forth a block diagram of automated computing machinery comprising an exemplary server (152) useful in providing a real-time indication of platform trust according to embodiments of the present invention.

The server (152) of FIG. 2 is coupled to the front side bus (162) and the I/O subsystem (197). Connection to the front side bus (162) enables the processor (156) to access other components of the server (152). For example, the server (152) of FIG. 2 includes random access memory (168) ('RAM') which is connected through a high speed memory bus (166) to the processors (156) and to other components of the server (152). The server (152) also includes a service processor (191) coupled to its own RAM (169).

Stored in the RAM (168) coupled to the processor (156) is an operating system (154). Operating systems useful providing a real-time indication of platform trust according to embodiments of the present invention include UNIX™, Linux™, Microsoft XP™, AIX™, IBM's i5/OS™, and others as will occur to those of skill in the art. The RAM (168) also includes system management RAM (184). SDRAM (184) is locaed and therefore is able to safeguard privileged instructions. An integrity measurement module (202) may be stored in SDRAM (184). The operating system (154) in the example of FIG. 2 is shown in RAM (168), but many components of such software typically are stored in non-volatile memory also, such as, for example, on a disk drive (170).

The server (152) of FIG. 2 includes disk drive adapter (172) coupled through expansion bus (160) and I/O Subsystem (197) to processor (196) and other components of the server (152). Disk drive adapter (172) connects non-volatile data storage to the server (152) in the form of disk drive (170). Disk drive adapters useful in computers for providing a real-time indication of platform trust according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example server (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example server (152) of FIG. 2 includes a video adapter (183), which is an example of an I/O adapter specially designed for graphic output to a display device (180) such as a display screen or computer monitor. Video adapter (183) is connected to processor (156) through a high speed video bus (164), I/O Subsystem (197), and the front side bus (162), which is also a high speed bus.

The exemplary server (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for providing a real-time indication of platform trust according to embodiments of the present invention include modems for wired dial-up communications, Ethernet (IEEE 802.3) adapters for wired data communications network communications, and 802.11 adapters for wireless data communications network communications.

Figure 3:
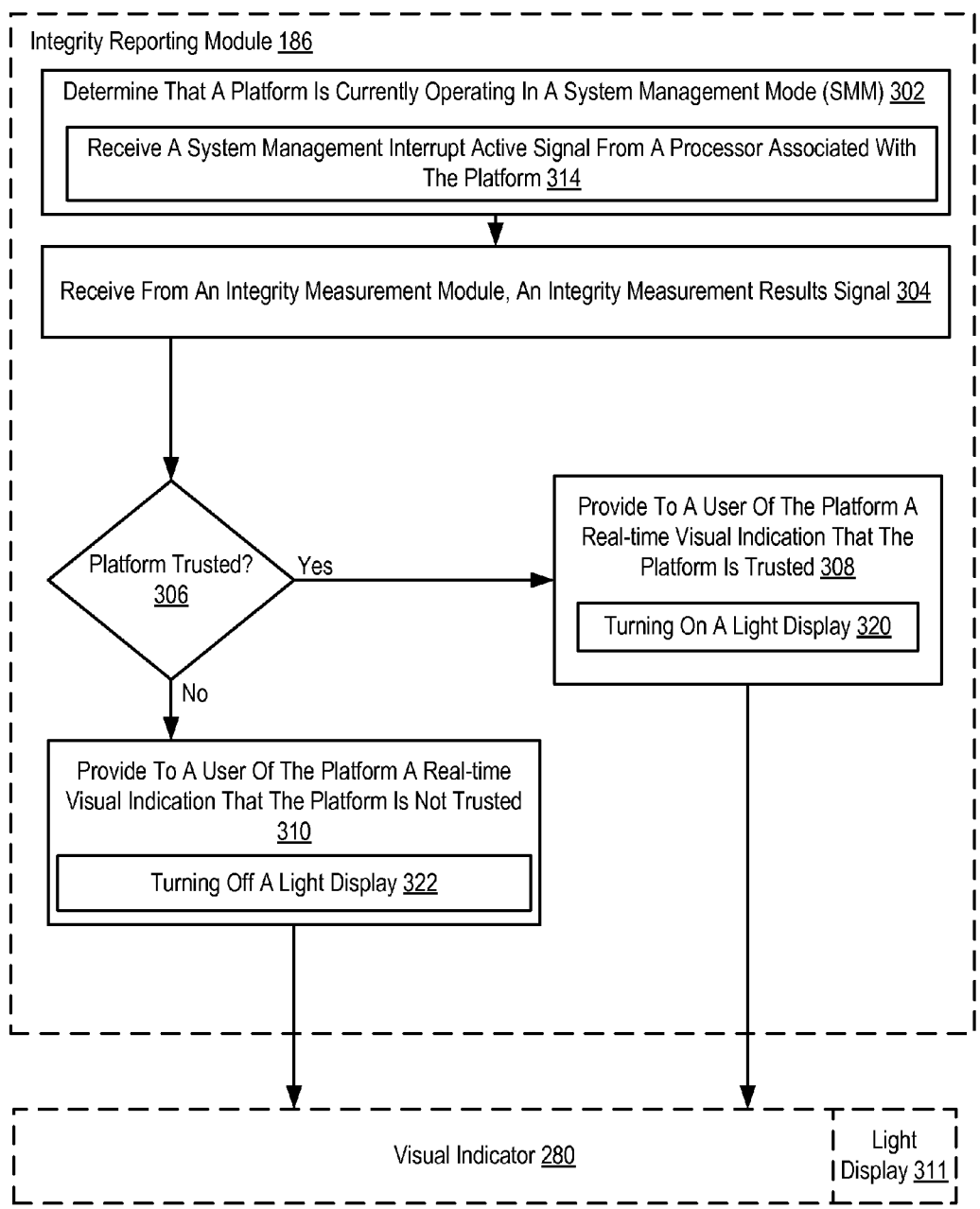
FIG. 3 sets forth a flow chart illustrating an exemplary method for providing a real-time indication of platform trust according to embodiments of the present invention FIG. 4 sets forth a flow chart illustrating a further exemplary method for providing a real-time indication of platform trust according to embodiments of the present invention.

FIG. 3 sets forth a flow chart illustrating an exemplary method for providing a real-time indication of platform trust according to embodiments of the present invention. The method of FIG. 3 includes determining (302), by an integrity reporting module (186), that a platform is currently operating in a system management mode (SMM). Determining (302), by an integrity reporting module (186), that a platform is currently operating in a system management mode (SMM) may be carried out by receiving (314) a system management interrupt active signal (201) from a processor (156) associated with the platform.

The method of FIG. 3 also includes receiving (304) from an integrity measurement module (202), by the integrity reporting module (186), an integrity measurement results signal (203). The integrity measurement results signal (203) is a result of an integrity measurement and attestation operation performed by the integrity measurement module (202) during a workload execution of the platform. Receiving (304) from an integrity measurement module (202), by the integrity reporting module (186), an integrity measurement results signal (203) may be carried out by detecting a change in the output of the processor (156).

The method of FIG. 3 includes in response to determining that the platform is currently operating in the SSM, determining (306), by the integrity reporting module (186), whether the received integrity measurement results signal indicates the platform is trusted. Determining (306), by the integrity reporting module (186), whether the received integrity measurement results signal indicates the platform is trusted may be carried out by analyzing the integrity measurement results signal (203).

If the received integrity measurement results signal (203) indicates that the platform is trusted, the method of FIG. 3 continues by providing (308) to a user (101) of the platform, by the integrity reporting module (186), a real-time visual indication (534) that the platform is trusted. Providing (308) to a user (101) of the platform, by the integrity reporting module (186), a real-time visual indication (534) that the platform is trusted may be carried out by turning on (320) a light display (311).

If the received integrity measurement results signal (203) indicates that the platform is not trusted, the method of FIG. 3 continues by providing (310) to the user (101) of the platform, by the integrity reporting module (186), a real time visual indication (311) that the platform is not trusted. Providing (310) to the user (101) of the platform, by the integrity reporting module (186), a real time visual indication (311) that the platform is not trusted may be carried out by turning off (322) the light display (311).

Figure 4:
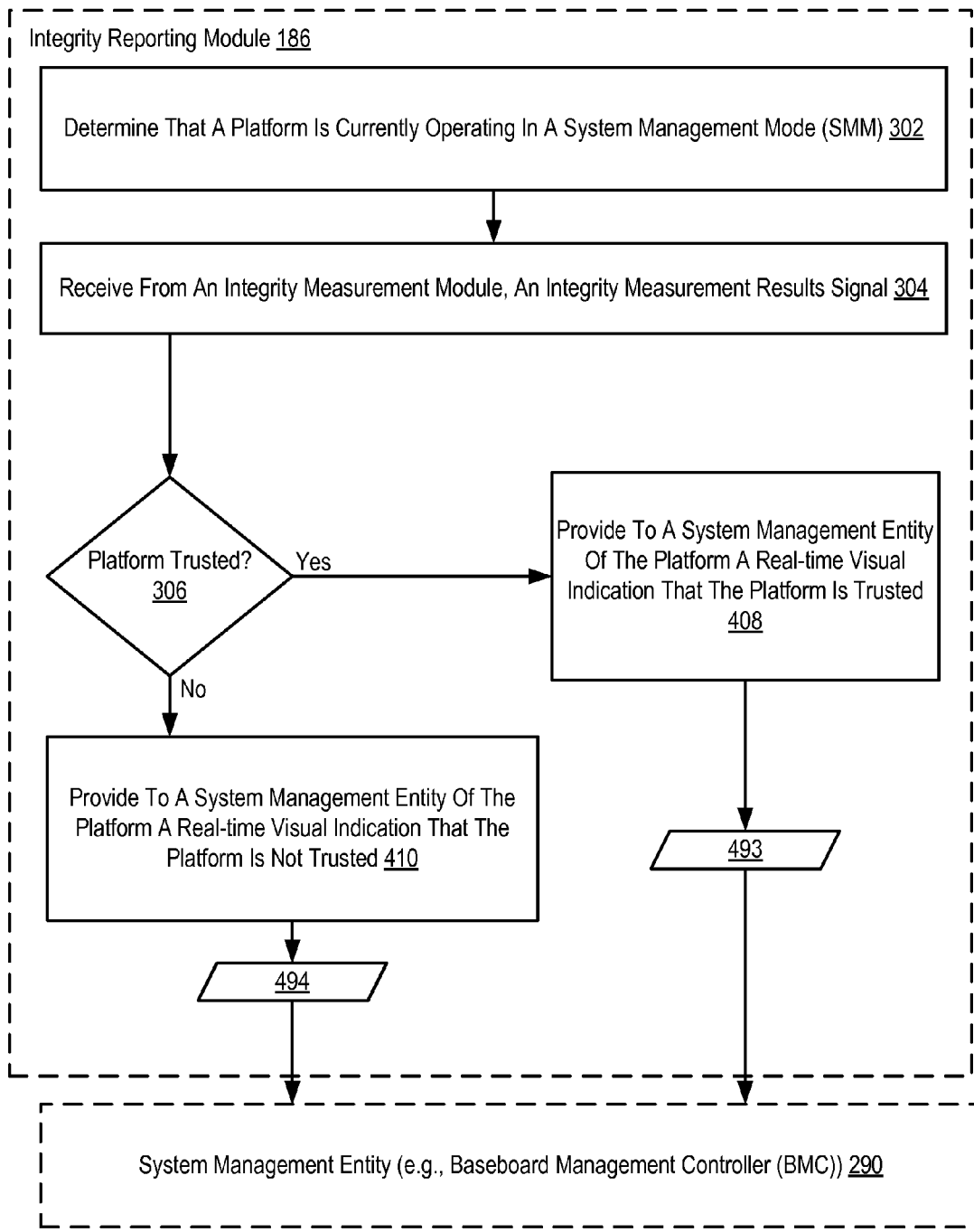

FIG. 4 sets forth a flow chart illustrating a further exemplary method for providing a real-time indication of platform trust according to embodiments of the present invention. The method of FIG. 4 is similar to the method of FIG. 3 in that the method of FIG. 4 also includes determining (302), by an integrity reporting module (186), that a platform is currently operating in a system management mode (SMM); receiving (304) from an integrity measurement module (202), by the integrity reporting module (186), an integrity measurement results signal (203); in response to determining that the platform is currently operating in the SSM, determining (306), by the integrity reporting module (186), whether the received integrity measurement results signal indicates the platform is trusted.

If the received integrity measurement results signal (203) indicates that the platform is trusted, the method of FIG. 4 includes providing (408) to a system management entity (290), by the integrity reporting module (186), a real-time indication (493) that the platform is trusted. Providing (408) to a system management entity (290), by the integrity reporting module (186), a real-time indication (493) that the platform is trusted may be carried out by transmitting the results signal (283) to the system management entity (290).

If the received integrity measurement results signal (203) indicates that the platform is not trusted, the method of FIG. 4 includes providing (410) to the system management entity (290), by the integrity reporting module (186), a real time indication (494) that the platform is not trusted. Providing (410) to the system management entity (290), by the integrity reporting module (186), a real time indication (494) that the platform is not trusted may be carried out by transmitting the results signal (283) to the system management entity (290)

Exemplary embodiments of the present invention are described largely in the context of a fully functional computer system for providing a real-time indication of platform trust. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing a real-time indication of platform trust, the method comprising:
   determining, by an integrity reporting module, that a platform is currently operating in a system management mode (SMM);
   receiving from an integrity measurement module, by the integrity reporting module, an integrity measurement results signal;
   in response to determining that the platform is currently operating in the SSM, determining, by the integrity reporting module, whether the received integrity measurement results signal indicates the platform is trusted;
   if the received integrity measurement results signal indicates that the platform is trusted, providing to a user of the platform, by the integrity reporting module, a real-time visual indication that the platform is trusted; and if the received integrity measurement results signal indicates that the platform is not trusted, providing to the user of the platform, by the integrity reporting module, a real time visual indication that the platform is not trusted, wherein the real time visual indication is based on continuous periodic assessments of the received integrity measurement results.

2. The method of claim 1 wherein determining, by an integrity reporting module, that a platform is currently operating in a system management mode (SMM) includes receiving a system management interrupt active signal from a processor associated with the platform.

3. The method of claim 1 wherein the integrity measurement results signal is a result of an integrity measurement and attestation operation performed by the integrity measurement module during a workload execution of the platform.

4. The method of claim 1 further comprising:
if the received integrity measurement results signal indicates that the platform is trusted, providing to a system management entity, by the integrity reporting module, a real-time indication that the platform is trusted; and
if the received integrity measurement results signal indicates that the platform is not trusted, providing to the system management entity, by the integrity reporting module, a real time indication that the platform is not trusted.

5. The method of claim 1 wherein the integrity reporting module is configured to authorize the integrity measurement results signal.

6. The method of claim 1 wherein the integrity reporting module includes comparison circuitry configured to generate a result signal in response to a system management interrupt signal and the integrity measurement results signal.

7. The method of claim 6 wherein the integrity reporting module includes a count-down timer configured to control a light display in response to the result signal generated by the comparison circuitry.

8. The method of claim 6 wherein the real time visual indication that the platform is not trusted is provided based on the result signal generated by the comparison circuitry.

9. The method of claim 1 wherein providing a real-time visual indication that the platform is trusted includes turning on a light display and wherein providing a real-time indication that the platform is not trusted includes turning off the light display.

10. An apparatus for providing a real-time indication of platform trust, the apparatus comprising an integrity reporting module comprising automated circuitry configured to:
determine that a platform is currently operating in a system management mode (SMM);
receive from an integrity measurement module, an integrity measurement results signal;
in response to determining that the platform is currently operating in the SSM, determine whether the received integrity measurement results signal indicates the platform is trusted;
if the received integrity measurement results signal indicates that the platform is trusted, provide to a user of the platform, a real-time visual indication that the platform is trusted; and
if the received integrity measurement results signal indicates that the platform is not trusted, providing to the user of the platform, a real time visual indication that the platform is not trusted, wherein the real time visual indication is based on continuous periodic assessments of the received integrity measurement results.

11. The apparatus of claim 10 wherein determining that a platform is currently operating in a system management mode (SMM) includes receiving a system management interrupt active signal from a processor associated with the platform.

12. The apparatus of claim 10 wherein the integrity measurement results signal is a result of an integrity measurement and attestation operation performed by the integrity measurement module.

13. The apparatus of claim 10 wherein the integrity reporting module comprising automated circuitry configured to:
if the received integrity measurement results signal indicates that the platform is trusted, provide to a system management entity a real-time indication that the platform is trusted; and
if the received integrity measurement results signal indicates that the platform is not trusted, provide to the system management entity a real time indication that the platform is not trusted.

14. The apparatus of claim 10 wherein the integrity reporting module is configured to authorize the integrity measurement results signal.

15. The apparatus of claim 10 wherein the integrity reporting module includes comparison circuitry configured to generate a result signal in response to a system management interrupt signal and the integrity measurement results signal.

16. The apparatus of claim 15 wherein the integrity reporting module includes a count-down timer configured to control a light display in response to the result signal generated by the comparison circuitry.

17. The apparatus of claim 15 wherein the real time visual indication that the platform is not trusted is provided based on the result signal generated by the comparison circuitry.

18. The apparatus of claim 10 wherein providing a real-time visual indication that the platform is trusted includes turning on a light display and wherein providing a real-time indication that the platform is not trusted includes turning off the light display.

* * * * *